United States Patent [19]

White et al.

[11] 4,193,871

[45] Mar. 18, 1980

[54] CLARIFIER

[75] Inventors: Harold R. White, New Lenox; Alexander J. Doncer, Jr., Palos Heights, both of Ill.

[73] Assignee: Alar Engineering Corporation, Chicago, Ill.

[21] Appl. No.: 15,463

[22] Filed: Feb. 26, 1979

[51] Int. Cl.² ........................................... B01D 21/00
[52] U.S. Cl. ................................. 210/142; 210/525; 210/527
[58] Field of Search .............. 210/519, 521, 522, 523, 210/525, 527, 532 R, 533, 534, 538, 86, 83, 97, 102, 112, 141, 142, 153

[56] References Cited

U.S. PATENT DOCUMENTS

| 3,333,704 | 8/1967 | McGivern et al. ................. 210/527 |
| 3,396,102 | 8/1968 | Forrest ................................ 210/527 |
| 3,788,477 | 1/1974 | Love ................................... 210/525 |

OTHER PUBLICATIONS

"Clarifiers," Bulletin 302, Aqua-Aerobic Systems, Inc.
"Environmental Control Systems & Equipment," Bulletin 1000, FMC Corp.
"Duff-Norton High Duty Cycle Activators," Bulletin 170, Amstar Corp.

Primary Examiner—Frank Sever
Attorney, Agent, or Firm—Hill, Van Santen, Steadman, Chiara & Simpson

[57] ABSTRACT

A longitudinally elongated settling tank with a converging longitudinal hopper bottom along the length thereof has a longitudinally elongated travelling bridge reciprocating continuously or intermittently through a relatively short stroke between the inlet and outlet ends of the tank from which depends a plurality of longitudinally spaced sludge pick-up heads each sucking sludge from a zone in the bottom of the tank during a preset cycle. Liquid fed into one end of the tank forms a settling pond from which clarified liquid flows over longitudinal weirs at the opposite end of the tank. Because of the short stroke of the bridge, the tank can be reinforced with internal framework between the paths of the suction heads permitting use of lighter sheet metal for the tank. A skimmer is automatically lowered into the top of the pond as the bridge advances to sweep oil, scum, and other material floating on the pond into an outlet and is retracted above the pond on the return stroke of the bridge.

22 Claims, 8 Drawing Figures

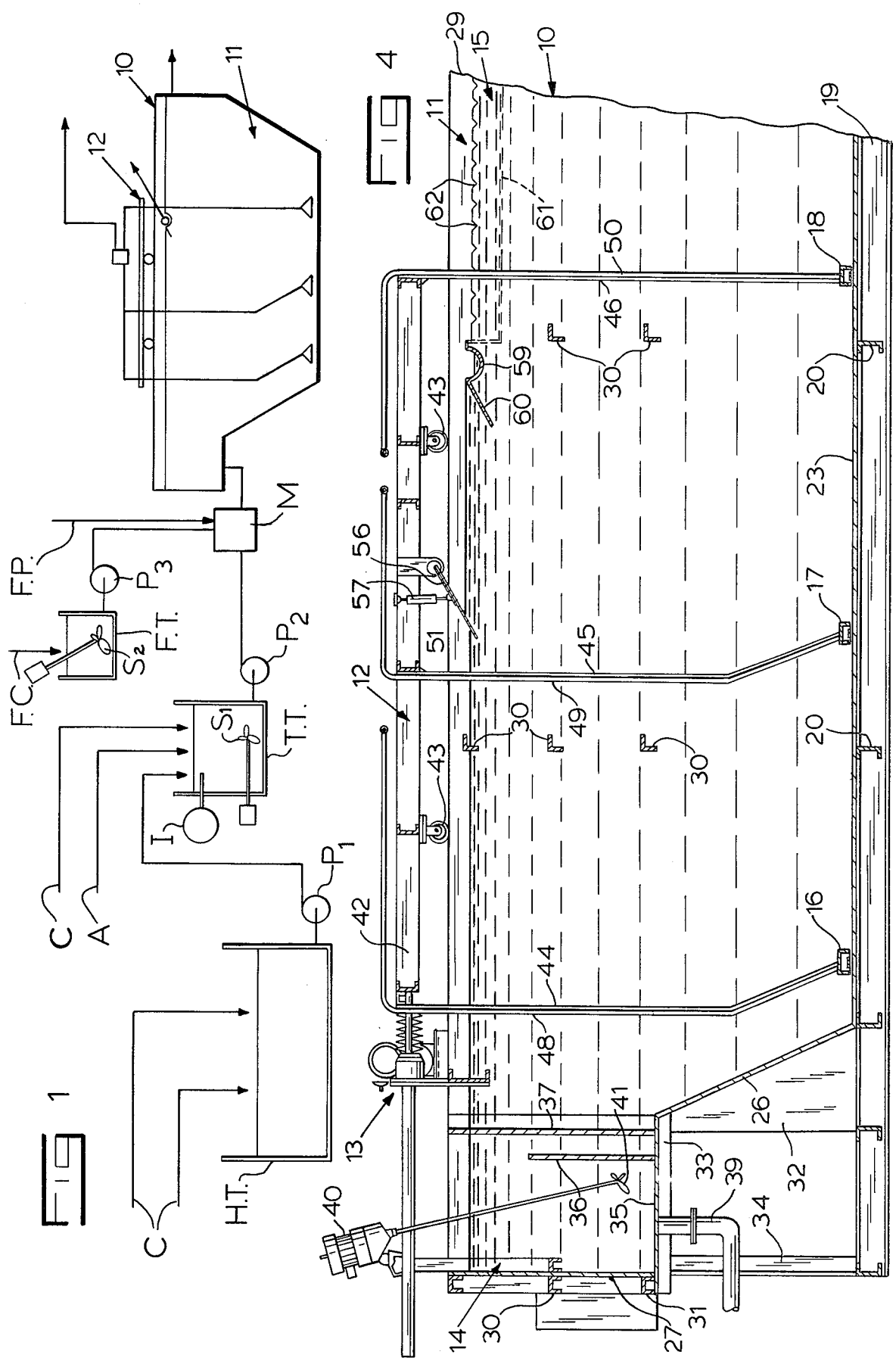

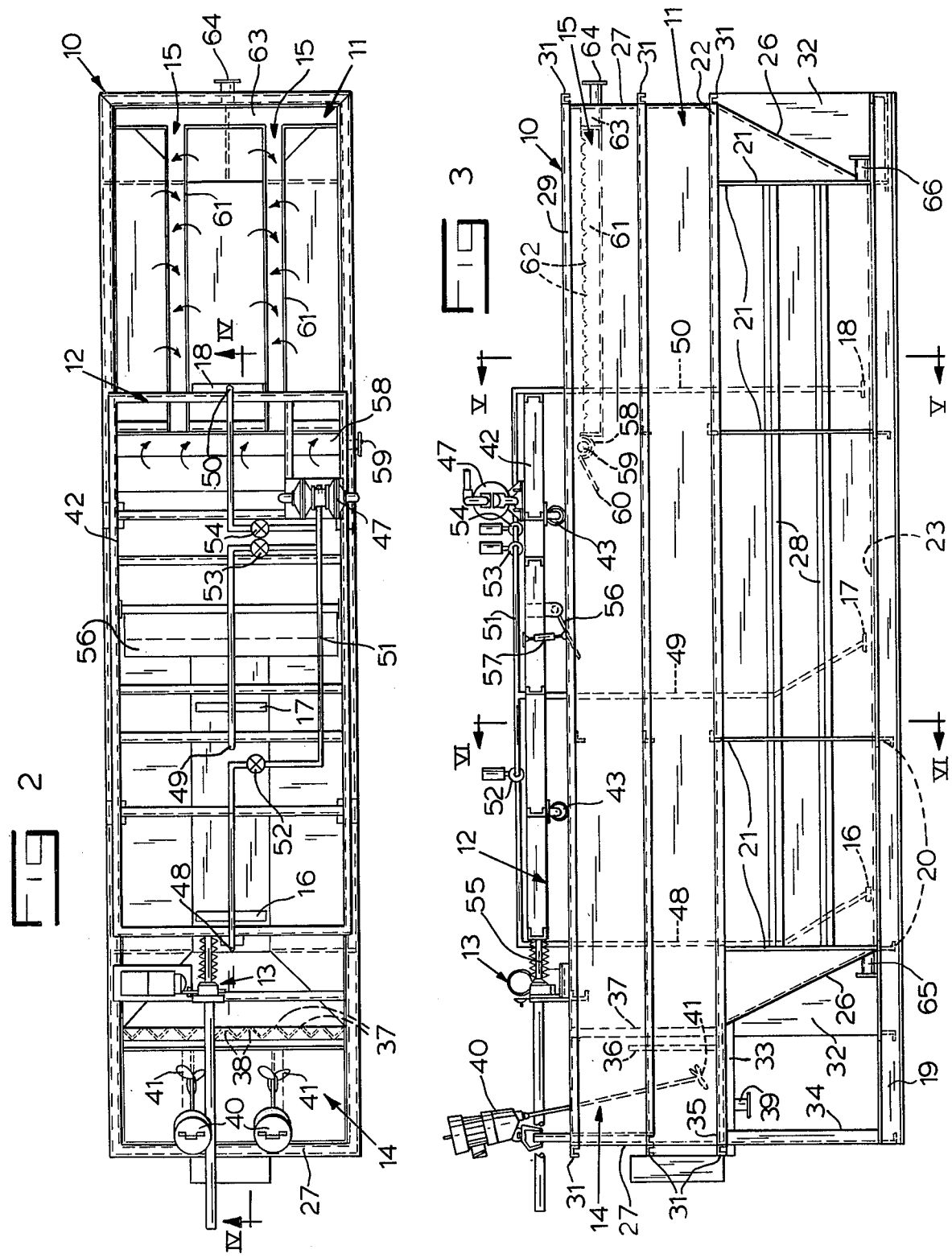

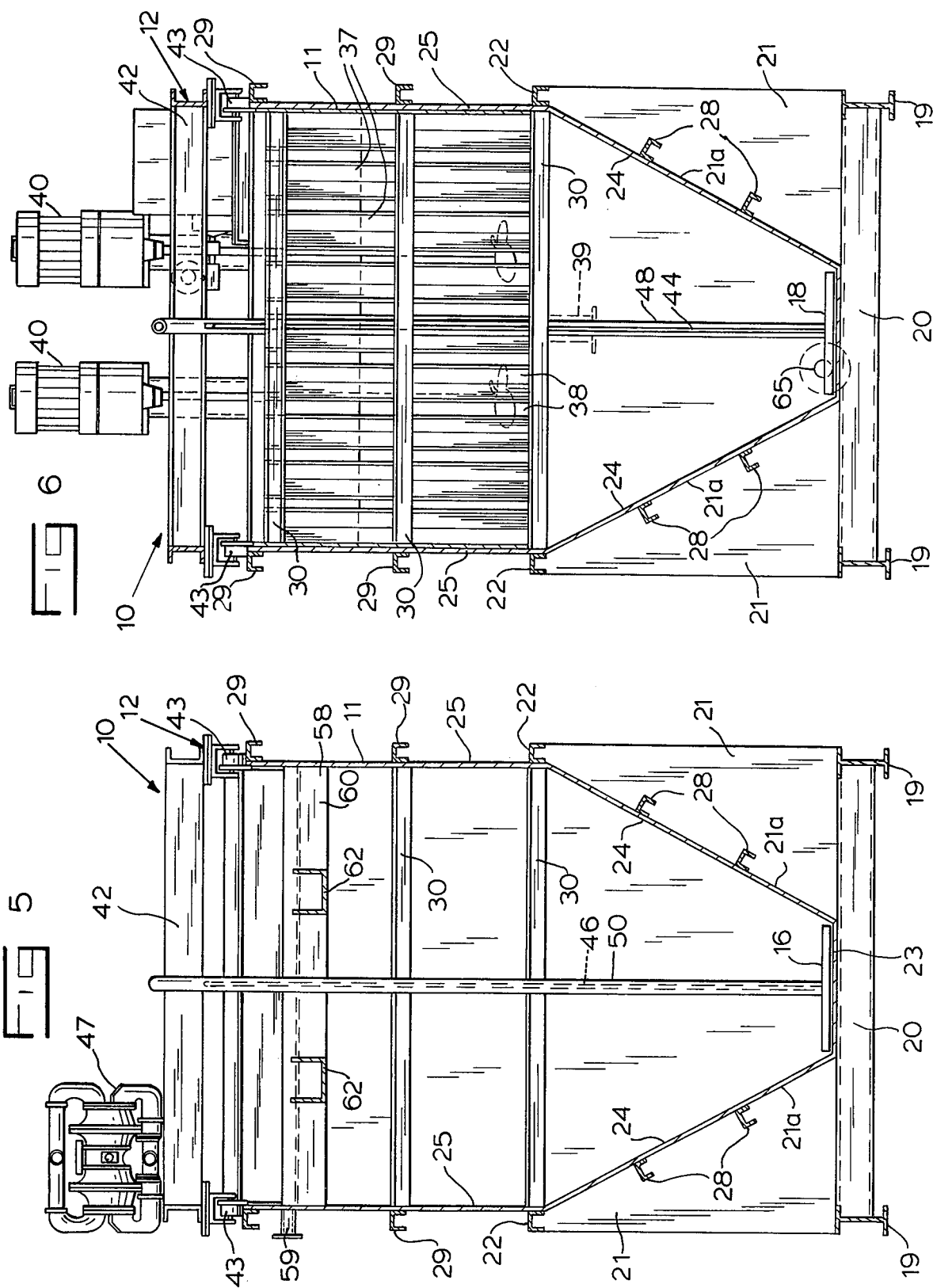

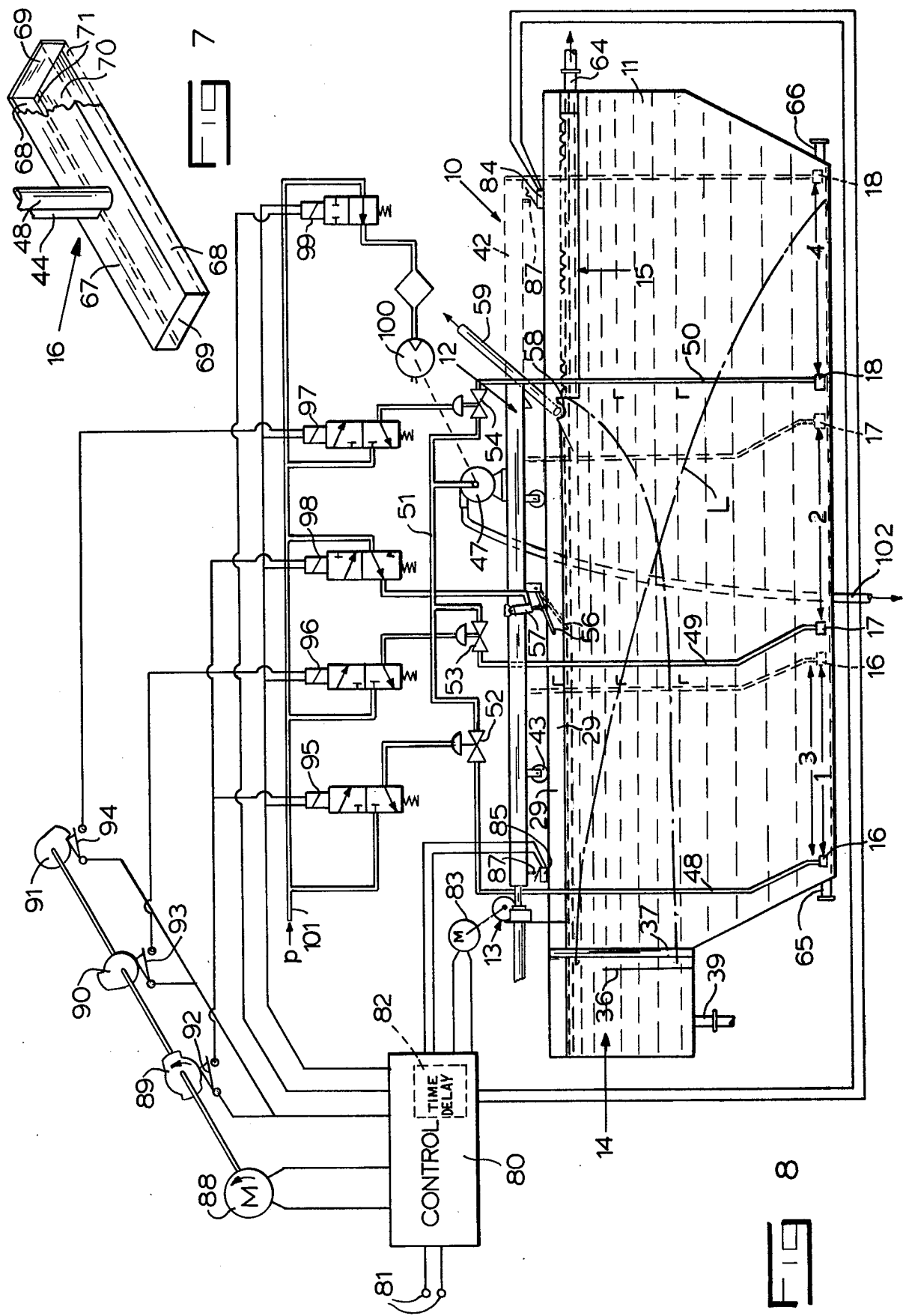

CLARIFIER

FIELD OF THE INVENTION

This invention relates to the art of settling solids from liquids in a continuous flow operation and particularly deals with a travelling bridge settling tank where the bridge reciprocates continuously or intermittently through a small stroke and suspends longitudinally spaced pick-up heads to suck sludge from zones of the settling pond or basin.

BACKGROUND OF THE INVENTION

Travelling bridge type clarifiers or settling tanks have heretofore required heavy, expensive, and bulky installations with transverse bridges moving the full lengths of the settling basin or pond. Sludge removal devices were suspended from these bridges requiring an unimpeded travel path through the length of the pond or basin. These devices took the form of scrapers pushing sludge settled to the bottom of the pond or basin into sumps or mechanisms operating with pumps, air lift or siphon devices. These scrapers or other removal mechanisms in serving the full length of the basin or pond required longer time intervals between periods of sludge removal at the inlet thus permitting relatively deep accumulations of heavy sludge that could not be efficiently removed. The movement of scrapers or the other removal devices through this heavy accumulation stirred up the sludge to decrease the settling efficiency.

SUMMARY OF THIS INVENTION

This invention now provides a travelling bridge type clarifier or settling tank which has a longitudinally elongated bridge that only travels through a relatively short stroke and carries longitudinally spaced pick-up heads each serving only a localized zone of the settling basin or pond in the tank. The bridge is operated intermittently or continuously and since each pick-up mechanism depending therefrom is not moved out of the local zone which it serves, tank frames such as reinforcing beams or struts can traverse the pond or basin between the zones thus providing a very strong, inexpensive lightweight tank construction which will not buckle under the load of the settling pond or basin. The longitudinally elongated bridge has a short operating stroke providing more cycles of operation in shorter time intervals. The cycles of operation can be preset to best serve local zones in the settling tank or basin.

Liquids to be clarified are fed through flow straighteners from an inlet compartment or zone preferably equipped with mixers for keeping the solids in suspension. The liquid flows over a dam or baffle and through narrow vertical gaps between flow straightening members to the inlet end of the settling tank, filling the tank to form a settling pond or basin. The opposite end of the tank has longitudinally extending weir troughs to receive clarified liquid from the top of the pond. A transverse gutter for receiving oil, scum or the like floating on top of the pond extends across the tank in front of the longitudinal weir troughs. The bridge supports a skimmer blade to push the material floating on top of the pond into the gutter. This blade is retracted out of the pond when the bridge is retracted.

The tank has converging sidewalls at the lower portion thereof providing a narrow hopper bottom along the length of the tank.

In a preferred arrangement three longitudinally spaced pick-up heads are suspended from the bridge in the hopper bottom of the tank. The first head sucks heavy sludge from the inlet end of the tank. The second head sucks the lighter sludge from the mid portion of the tank while the third head sucks the lightest sludge from the outlet end of the tank. The stroke of the bridge is only about one third of the length of the tank and each of the suction heads serve about one third of the tank.

A preferred cycle of operation includes advancing the bridge toward the outlet end of the tank while evacuating the first suction head to remove the heavier sludge from the inlet end of the tank. The bridge is then returned to its initial position with the second head being evacuated to suck the sludge from the mid portion of the tank. On the next advancing stroke of the bridge the first suction head is again evacuated and on the following retraction of the bridge the third suction head is evacuated. Thus sludge removal is effected in both directions of reciprocation of the bridge with the heavier sludge at the inlet end of the tank being subjected to two removal cycles for every single removal cycle in the central and outlet ends of the tank.

The bridge is supported on wheels which ride on tracks along the top sides of the tank and a ball nut and screw actuator reciprocates the bridge.

The longitudinal weirs extend into the tank from the outlet end for a distance of about one third of the length of the settling pond and gently move out the clarified top liquid while underwater settlement is still taking place. These weirs minimize the amount of flow required at a bottom drain outlet for maintaining the settling pond in an efficient settling condition.

It is then an object of this invention to provide a travelling bridge type clarifier with a longitudinally elongated bridge reciprocating in a short stroke and suspending pick-up heads which serve successive zones of the tank in a preset cycle.

Another object of the invention is to provide an elongated settling tank with internal transverse frames and a bridge travelling along the top thereof suspending suction pick-up heads for removing sludge in the bottom thereof and operating only in local zones along the length of the tank between the frames.

Another object of the invention is to provide a continuous flow clarifier having an elongated settling tank with a hopper bottom along the length thereof, an inlet at one end, longitudinally extending top weirs at the opposite end and a reciprocating bridge suspending sludge pick-up heads in the hopper bottom of the tank in longitudinally spaced relation to serve successive localized zones of the tank.

A specific object of the invention is to provide a travelling bridge clarifier with an elongated tank having an inlet at one end thereof, top outlet weirs extending longitudinally into the opposite end thereof, beams extending across the tank in longitudinally spaced relation, a reciprocating bridge on top of the tank, suction heads suspended from the bridge between the longitudinally spaced beams, the means for reciprocating the bridge through a short stroke that moves the heads only in zones between the beams.

Another object of the invention is to provide a settling tank with sludge removal heads suspended from a reciprocating bridge which are evacuated in a preset cycle as the bridge is reciprocated.

Another object of the invention is to provide a settling tank with a travelling top skimmer sweeping matter floating on a pond in the tank and having mechanisms operating the skimmer so that it is immersed in the settling pond only on an advancing stroke.

Other and further objects of this invention will become apparent to those skilled in this art from the following detailed description of the annexed sheets of drawings which, by way of a preferred example only, illustrate an embodiment of the invention.

ON THE DRAWINGS

FIG. 1 is a schematic showing of a system for clarifying liquids including a travelling bridge clarifier of this invention.

FIG. 2 is a top plan view of a travelling bridge clarifier according to this invention.

FIG. 3 is a side elevational view of the travelling bridge clarifier of FIG. 2.

FIG. 4 is a longitudinal sectional view of the clarifier of FIGS. 2 and 3 taken substantially along the line IV—IV of FIG. 2 on a somewhat larger scale.

FIG. 5 is a transverse sectional view taken along the line V—V of FIG. 3.

FIG. 6 is a transverse sectional view taken along the line VI—VI of FIG. 3.

FIG. 7 is a perspective view, with parts broken away, of a suction head of the clarifier.

FIG. 8 is a somewhat diagrammatic view of the operation of the clarifier of this invention including controls for the sequence of operation.

BRIEF DESCRIPTION OF THE PREFERRED EMBODIMENT SHOWN ON THE DRAWINGS

As shown in FIG. 1, the travelling bridge clarifier 10 of this invention is generally useful for separating oil and solids from waste water in industrial plants such as steel mills, chemical factories, ceramic potteries, metal plating shops, oil fields, and the like.

A typical industrial waste water treatment installation includes a holding tank or pond H.T. receiving the waste water from one or more conduits C emerging from plant locations. A pump $P_1$ delivers the waste liquid from the tank to a treatment tank T.T. where its pH is adjusted by caustic from conduit C or acid from conduit A to a level of about 8 as read from an indicator I. An agitator or stirrer $S_1$ is provided to mix the ingredients in the tank T.T.

A second tank F.T. is provided for admixing ferric chloride from a source F.C. with water to form a solution or suspension and is equipped with a stirrer $S_2$ to mix the ingredients.

A pump $P_2$ feeds the pH adjusted water from the tank T.T. to a static mixer M where a flocculating material such as a polymeric resin is fed from a source F.P. and mixed with the water and ferric chloride fed from tank F.T. by a pump $P_3$. The mixer M discharges the treated waste water to the inlet end of the tank 11 of the clarifier of this invention.

A travelling bridge clarifier 10 of this invention shown on the drawings, includes an elongated tank 11, a bridge 12 riding on top of the tank 11, drive mechanism 13 for reciprocating the bridge 12 on the tank 11, an inlet compartment 14 on one end of the tank 11, overflow weirs 15 at the opposite end of the tank 11 and suction heads 16,17 and 18 suspended from the bridge 12 in closely spaced relation just above the bottom of the tank 11.

The tank 11 has external framework including longitudinally extending I beams, 19, with transverse channel beams 20 at spaced intervals therebetween and cooperating therewith to form a frame bed. Triangular shaped frame plates 21 are mounted in spaced relation at intervals along the length of the bed frame with their inclined sides facing each other and diverging upwardly and outwardly from the base frame as shown at 21a. Channel beams 22 mounted on top of these plates 21 extend along the length of the tank.

The tank walls are formed from sheet steel supported by the framework and include a narrow bottom portion 23 resting on the base frame beams 20, bottom sidewalls 24 extending upwardly and outwardly from the longitudinal sides of the bottom wall 23, and vertically upstanding sidewalls 25 on the top ends of the sloping walls 24. End walls 26 (FIG. 3) close the ends of the sloping sidewalls 24 and end walls 27 close the ends of the vertical walls 25.

Channel beams 28 extend between the plates 21 against the sidewalls 24 to reinforce these walls against buckling under load. Channel beams 29 also extend longitudinally along the outsides of the sidewalls 25 to reinforce these sidewalls. One of these channel beams 29 on each sidewall 25 is at the top of the sidewall to form a track for the carriage 12.

The tank walls are also reinforced by internal angle beams 30 which span the space between the opposite sidewalls and extend across the interior of the tank. These beams 30 are superimposed in vertically spaced relation at longitudinally spaced intervals so that they will lie in areas in the tank which will not interfere with manipulation of the suction heads. In the illustrated arrangement the beams 30 will have one group at the area of the tank between the first and second operating zones and the second group between the second and third operating zones as more hereinafter fully described.

Transverse end beams 31 similar to the side beams 28 and 29 overlie the end walls 27 to reinforce them against buckling. Triangular end gusset plates 32 mounted on the bed frame also overlie the end walls 26 to reinforce and support these walls.

The inlet compartment 14 is supported on beams such as 33 from upright beams 34 on the bed frame and also from an end gusset plate 32 as best shown in FIGS. 3 and 4. This inlet compartment 14 has a horizontal bottom wall 35 level with the top end of the sloping end wall 26 and is closed at its outer end by the end wall 27.

From the above description it should therefore be understood that the tank construction has external and internal framework amply supporting sheet metal walls in such a manner that relatively thin walls can be used to support heavy pond loads in the tank. The framework, however, does not obstruct the interior of the tank. The tank can vary greatly in size depending upon its use requirements. Tank sizes of from 3 feet in width and 12 feet in length to 12 feet in width and 48 feet in length are easily provided by this construction. The general tank shape is rectangular with a converging hopper bottom that may form about one-half the height of the tank. This hopper bottom has a narrow flat bottom wall with sloping sidewalls diverging to the bottoms of upstanding vertical top walls. Sloping end walls are also provided diverging to a vertical end wall 27 at the outlet end of the tank and the inner end of the bottom wall 33 of the inlet compartment 14 at the inlet end of the tank.

The inlet compartment 14 has an upright baffle 36 extending from its bottom wall 35 and a plurality of spaced upright flow straightener ribs 37 are mounted on the bottom wall 35 in front of this baffle 36. These ribs 37 extend the full height of the compartment 14 while the baffle 36 terminates at a level beneath the top of the compartment. As shown in FIG. 2 the ribs 37 are V-shaped with their divergent wings being spaced apart to provide gaps 38 through which flow is accommodated from the compartment 14 into the top of the main tank area.

The fluid material to be clarified is fed into the bottom of the compartment 14 through a bottom inlet 39 behind the baffle 36 and must flow over the baffle to exit through the gaps 38 into the tank.

A pair of electric motor driven stirrers 40 are mounted on the end wall 27 of the compartment 14 and drive propellers 41 in the bottom of the compartment behind the baffle 36 to keep solids in suspension in the liquid to be clarified as it is fed into the bottom of the compartment from the inlet 39.

The carriage 12 has an open rectangular frame 42 formed from longitudinal and transverse channel beams. This frame is longitudinally elongated to overlie about three-fourths of the length of the tank 11. Flanged wheels 43 are rotatably mounted under the frame to ride on the top channel beams 29 of the tank 11 on each side of the tank as best shown in FIGS. 5 and 6. These wheels 43 are positioned in aligned pairs with two pairs being sufficient to support the frame and guide it along the top of the tank 11.

Three rigid frame struts 44,45 and 46 depend from the frame 42 of the bridge 12 to support the suction heads 16,17 and 18 in the bottom of the tank just above the bottom wall 23. The strut 44 depends from the end of the frame 42 adjacent the inlet compartment 14, the strut 45 depends from the central portion of the frame while the strut 46 depends from the end of the frame adjacent the outlet. The suction heads are thus rigidly suspended in the tank under the bridge 12.

An air driven diaphragm type pump 47 is mounted on the frame 42 of the bridge 12 to suck sludge from each of the vacuum heads 16,17 and 18 through pipes 48,49 and 50 each mounted on a strut 44,45 and 46. These pipes 48,49 and 50 are connected to a header pipe 51 connected to the suction side of the pump 47. Valves 52,53 and 54 selectively control flow from each pipe 48, 49 and 50 to the header pipe 51 in a timed sequence as will be more fully hereinafter described.

The bridge 12 is continuously or intermittently reciprocated along the top of the tank 11 by the drive mechanism 13 which, in the preferred illustrated form, is a ball-nut motor reciprocating a rod 55. It should be understood, however, that any other actuator could be used for the bridge such as a pneumatic or hydraulic motor, an electric motor or the like. The drive mechanism 13 propels the bridge 12 through only a short stroke of about one-fourth the length of the tank 11 since, as shown in FIGS. 2 to 4 the bridge 12 is about three-fourths the length of the tank so that a stroke of about one-fourth the length of the tank will move the suction heads 16,17 and 18 sufficiently to traverse the entire lengths of the zones which they serve and thus collectively serve the entire length of the tank.

The bridge frame 12 pivotally suspends a skimmer plate or scraper 56 extending across the width of the tank at about the midpoint of the bridge. A jack 57 raises and lowers this skimmer plate 56 to push oil and floating debris on top of the pond in the tank as the bridge advances toward the outlet end of the tank and to raise the skimmer plate above the pond as the bridge is retracted toward the inlet end of the tank.

A transverse trough 58 spans the top of the tank in front of the weirs 15 and is drained by an outlet 59 on one side of the tank. An inclined ramp 60 on the trough receives the skimmer plate 56 thereover as the skimmer pushes the floating debris into the trough.

The weirs 15 include a pair of longitudinally extending open top boxes or channels 61 with V notches 62 in the tops of their sidewalls providing overflow channels from the top of the pond in the tank into the boxes 6. The rear ends of these boxes 61 discharge to a transverse channel 63 at the outlet end of the tank. The channel 63 is drained by an outlet 64. The troughs or channels 61 extend in parallel relation from the outlet end of the tank for a distance of about one-third of the length of the tank and have their notched sides 62 at a level below the top of the tank but right at the level of the top of the pond in the tank. Clarified liquid from the pond thus flows quietly through the notched channels while liquid in the pond under these channels continues to settle. The boxes 61 of the weirs are spaced apart in parallel relation so that the strut 46 supporting the suction head 18 can move freely between the boxes.

The very bottom of the tank has drain outlets 65 and 66 at the inlet and outlet ends of the hopper bottom respectively. These drain outlets are useful to drain the unit for inspection and maintenance. These outlets 65 and 66 are closed when the suction heads are functioning to remove the sludge.

A typical suction head 16 is illustrated in the perspective view of FIG. 7. This head 16 is a rectangular box with a sheet metal top wall 67, depending sidewalls 68, depending end walls 69, and a bottom wall 70. The bottom wall 70 terminates short of the bottom edges of the sidewalls 68 to provide narrow slot openings 71 behind these sidewalls 68. The suction pipe 48 communicates with the interior of the box at the central portion of the top wall 67. A supporting strut 44 is also secured to this top wall to rigidly unite the head with the strut.

A typical installation would have a suction head about 9 inches in width, 24 inches in length, 2 inches in height, with the slot openings 71 being about three-eighths of an inch wide. It will of course be understood that these dimensions may vary widely.

The suction heads provide unobstructed parallel slots 71 opening to the very bottom 23 of the tank 11 for unimpeded flow of the sludge into the head and through a suction pipe 48.

OPERATION

The operation of the clarifier 10 will be more fully understood from the diagrammatic showing in FIG. 8 where a control panel 80 is illustrated as receiving current from a source 81. A time delay mechanism 82 in the panel selectively energizes a motor 83 for driving the actuator 13 for the bridge 12. Reversing switches 84 and 85 near the ends of the track beams 29 are tripped by fingers 86 and 87 on the ends of the bridge 12 to reverse the direction of the bridge 12 by reversing the direction of the motor 83.

A stepping motor 88 drives cams 89,90 and 91 to selectively close switches 92,93 and 94 in an electrical circuit including solenoid valves 95,96 and 97 controlling the valves 52,53 and 54 which selectively connect the suction conduits for the suction heads 16,17 and 18 with a suction manifold 51. In addition the switches also control a solenoid valve 98 for the pneumatic jack 57 operating the skimmer 56 and a solenoid valve 99 for an air motor 100 driving the suction pump 47. An air pressure line 101 is selectively connected through these solenoid operated valves, to energize the jack 57 in opposite directions, and to energize the suction pump 47.

The arrangement is such that with the bridge in the solid line position of FIG. 8 at the left hand end of the tank, the switch 85 will be closed to energize the motor 83 for driving the actuator 13 to move the bridge toward the right hand end of the tank. Upon initiation of this movement a switch 92 is closed and a solenoid valve 95 is opened to feed air pressure to the valve 52 connecting the first suction head 16 to the suction header 51. At the same time the solenoid valve 98 is de-actuated to release air pressure from the jack 57 and lowering the skimmer into the top of the pond in the tank 11 by gravity. Also the solenoid valve 99 is opened so that the motor 100 will be driven to energize the suction pump 47. This operating condition will prevail until the bridge 12 reaches the end of its stroke and trips the reversing switch 84. During this stroke the suction head 16 will have moved from the solid to the dotted line positions traversing the inlet end of the hopper bottom of the tank through an advancing stroke designated by the arrow headed line 1.

Upon tripping of the reversing switch 84, a time delay will be initiated to allow all mechanisms to come to a complete stop and then the switch 92 will be opened closing the valve 52 through de-energization of the solenoid valve 95 and the suction head 16 will be deactivated. At the same time, however, the switch 93 is closed to actuate the solenoid 96 opening the valve 53 and connecting the suction head 17 to the suction header 51 which is in the dotted line position and is being retracted to the solid line position along a stroke shown by the arrow headed line 2. On the retracting strokes of the bridge the solenoid valve 98 is energized to supply air pressure to the jack 57 to raise the skimmer above the top of the pond.

When the bridge is retracted to move the suction head 17 to the solid line position, the switch 85 is again tripped to advance the bridge and a double lobed cam 89 again closes the switch 92 to activate the suction head 16 through an advancing stroke designated by the arrow headed line 3. Upon reaching the end of this second advancing stroke the bridge again trips the switch 84 again reversing the direction of movement of the bridge. At this point the cam 91 closes a switch 94 to activate the suction head 18 through a reversing stroke designated by the arrow headed line 4.

The double lobed cam 89 thus closes the switch 92 twice for each single closing of the switches 93 and 94 causing the suction head 16 to be activated on each successive advancing stroke of the bridge. Since this switch 92 also controls the solenoid valve 98 for releasing air from and feeding air to the jack 57, the skimmer plate 56 is lowered by gravity on each advancing stroke and retracted by air pressure on each retraction stroke.

A liquid to be clarified, as explained above, is fed into the inlet compartment 14 behind the baffle 36 through the bottom inlet 39 and is continually agitated in the compartment so that solids will not settle out and the sludge containing liquid will flow over the baffle 36 through the gaps between the flow straighteners 37 into the large elongated pond in the main tank 11. The solids entering the pond will settle from the liquid along a zone or dividing line L with the liquid below this line containing concentrated solids and the liquid above the line being free from said solids. It is thus apparent that the settling solids will accumulate most in the zone immediately following the inlet compartment and more sludge will accumulate at the bottom of the tank in this zone. This extra accumulation of sludge is accommodated by the two successive advancing strokes of the suction head 16.

The middle zone of the pond will accommodate the settling out of the lighter sludge and a single retraction stroke of the suction head 17 is sufficient to remove this settled out lighter sludge.

The lightest solid particles will settle in the outlet zone of the pond under the weirs 15 and a single retraction stroke of the suction head 18 is sufficient to accommodate removal of these lightest sludge solids.

The weirs 15 gently remove the clarified liquid from the very top of the pond at the outlet end thereof without stirring up the solids that have settled below this level. These weirs, by projecting longitudinally into the pond can remove the clarified water while a liquid underlying the weirs is still subjected to a settling treatment.

Oil, scum or other debris floating on top of the pond in advance of the weirs is skimmed into the overflow trough 58 and discharged.

Clarified water is removed at the outlet 64, the skimmed off scum is removed at the outlet 59 and the sludge is discharged from the vacuum pump 47 through an outlet 102.

The direct outlets 65 and 66 can accommodate a flow of sludge laden liquid along the bottom 23 of the tank which is not removed by the suction heads 16, 17 and 18. A slight overflow of sludge liquid at this bottom level may be desirable. The sequence of operation of the suction heads can, of course, be varied to suit operating conditions and the bridge 12 can be continuously or intermittently actuated. The suction heads, however, should be energized one at a time since simultaneous suction in two or more of the heads would cause the heavier sediment to clog one of the heads and only permit removal of the lighter solids.

The bridge is preferably moved at relatively low speeds of from one-half to four feet per minute with an average of two feet per minute but the frequency of operation can be widely varied from continuous reciprocation to one or two strokes per hour.

SUMMARY

From the above descriptions it will be understood that this invention provides a travelling bridge clarifier having a tank construction with external and internal framework making possible the use of thin gauge sheet metal for the tank without risk of bulging or other distortion during use. The bridge of the clarifier rides on top of the tank, is substantially elongated, and only has a stroke of from one-fourth to one-third of the length of the tank. The tank itself is rectangular to optimize settling of solids, has a hopper bottom providing maximum sludge concentration and has localized settling zones each served by a suction head.

An air operated diaphragm pump is provided for positive controlled sludge removal without floc degradation and all the equipment on the bridge is preferably pneumatic to eliminate electrical cables. No moving parts are required for under water submersion.

Flow straighteners are provided to reduce initial turbulence and maintain uniform flow distribution across the width of the tank area.

A retractable oil skimmer and oil collection trough is provided and an extended weir arrangement accommodates removal of clear water as it is being formed resulting in lower horizontal velocities and improved settling of fine particles.

The clarifiers can be designed for widely varying process requirements and vary in size from small tanks handling only from 18 to 36 gallons per minute to large tanks handling from 300 to 600 gallons per minute.

We claim as our invention:

1. A travelling bridge clarifier comprising an elongated rectangular tank having a converging hopper bottom with a narrow sediment collecting zone along the length of the tank, an inlet compartment at one end of said tank and an outlet at the other end of the tank, vertical flow straighteners between said compartment and said tank, a vertical baffle behind said flow straighteners directing liquid to be clarified over the top thereof to the flow straighteners, outlet weirs projecting longitudinally in the top of the tank from the outlet end thereof and receiving clarified liquid along the lengths thereof, a bridge moveable along the top of the tank, longitudinally spaced suction heads fixedly secured to said bridge suspended in the bottom of said tank from said bridge, means for reciprocating said bridge along said tank in a predetermined stroke to maintain said suction heads within localized portions in the bottom of said tank, and means for selectively independently evacuating said suction heads to remove sludge from said localized portions of the narrow sediment collecting zone of the tank.

2. The clarifier of claim 1 wherein the bridge has a longitudinal length greater than one-half the length of the elongated rectangular tank.

3. The clarifier of claim 1 wherein the means for reciprocating said bridge limits the stroke of the bridge to move the longitudinally spaced suction heads only in localized zones along the length of the tank.

4. The clarifier of claim 1 wherein the suction heads are positioned to serve the inlet end of the tank, the central portion of the tank, and the outlet end of the tank and the means for reciprocating the bridge limits the movement of the suction heads to the zones which they serve.

5. The clarifier of claim 1 wherein the means for selectively evacuating said suction heads operates in a cycle subjecting the inlet end of the tank to a plurality of evacuations for each evacuation of the other suction heads.

6. The clarifier of claim 1 wherein the means for reciprocating the bridge and the means for selectively evacuating the suction heads are correlated to evacuate one of the suction heads on two strokes of the bridge while the other suction heads are evacuated during a single stroke of the bridge.

7. A settling tank adapted to receive a liquid suspension of solids at one end and discharge clarified liquid at the opposite end which comprises an elongated tank having an inlet at one end, an outlet at the opposite end, a hopper bottom along the length thereof defining a narrow sediment collecting zone between said ends, a longitudinally alongated bridge riding on top of said tank, longitudinally spaced suction heads fixedly suspended from said bridge at levels adjacent said hopper bottom, means for reciprocating said bridge through a relatively short stroke to move said suction heads in localized portions of said narrow sediment collecting zone for removing sediment from said portions, control means sequentially independently energizing said suction heads during reciprocation of said bridge, and longitudinally extending weir means in the outlet end of said tank adjacent the top of the tank receiving clarified liquid from the tank for discharge to the outlet.

8. The settling tank of claim 7 wherein the relatively short stroke of the bridge is less than half the length of the tank.

9. The tank of claim 7 wherein a first suction head is suspended in the inlet end of the tank, a second suction head is suspended in the mid-portion of the tank, and a third suction head is supported in the outlet end of the tank and the short stroke of the bridge is limited to move the suction heads only in the localized zones in which they are suspended.

10. The tank of claim 7 wherein the opposite end of the tank has longitudinally extending troughs with overflow notches along the lengths thereof at the top of the tank to receive clarified liquid from the outlet end of the tank and discharging to said outlet of the tank.

11. The tank of claim 7 including a trough extending transversely across the upper portion of the tank, and a skimmer mounted on said bridge for pushing material into said trough.

12. The tank of claim 7 including a skimmer blade pivotally suspended from said bridge extending across the top of the tank, and means for lowering said skimmer into the tank during an advancing stroke of the bridge and lifting said skimmer out of the tank during the retracting stroke of the bridge.

13. The tank of claim 7 including vertical top walls defining a rectangular enclosure and sloping walls converging from the bottoms of the top wall to said hopper bottom.

14. A settling tank construction which comprises a bed frame, upright frames supported from said bed frame, sheet metal walls supported from said bed and upright frames defining an enclosure for a settling pond, internal frame struts extending transversely across the settling pond enclosed by the sheet metal at longitudinally spaced intervals to reinforce the sheet metal against buckling, a bridge riding over the top of the tank, suction heads at the bottom of said tank fixedly suspended from said bridge in zones between the internal frame struts, means for reciprocating said bridge to move the suction heads in said zones divided by said internal frame struts, and means to selectively, independently actuate said suction heads.

15. The tank of claim 14 wherein the bridge is longitudinally elongated to extend over about three-quarters of the length of the tank and the means for reciprocating the bridge limits movement of the bridge to about one-fourth of the length of the tank.

16. The tank of claim 14 including frame beams extending along the length of the top of the tank and wheels on the bridge riding on these beams.

17. The tank of claim 14 including a compartment at one end thereof and transversely spaced flow straightener members with vertical gaps therebetween defining flow paths from said compartment into said tank.

18. The tank of claim 14 wherein the internal frame struts are arranged in vertically spaced relation along the height of the tank.

19. In a travelling bridge clarifier having an elongated tank with an inlet at one end thereof, an outlet at the opposite end thereof and a sediment collecting zone at the bottom thereof extending between said inlet and said outlet ends together with a bridge mounted for reciprocation over the top of said tank, the improvements of longitudinally spaced sludge removal suction heads suspended in the tank from said bridge and fixed to the bridge to suck sediment from the bottom of the tank as the bridge is reciprocated on the tank, means to reciprocate said bridge in a predetermined stroke to maintain said suction heads within localized zones in the bottom of the tank, and means for selectively energizing said suction heads to sequentially remove sediment from localized zones in the bottom of the tank.

20. The clarifier of claim 19 including a single suction pump for all of said sludge removal heads and valves selectively connecting said heads with said pump.

21. The clarifier of claim 20 wherein said valves are energized in a preset cycle to connect only one suction head at a time with said suction pump.

22. The clarifier of claim 19 including timing mechanisms for energizing the suction heads in a preset cycle relative to advancing and retracting strokes of the bridge.

* * * * *